(12) United States Patent
Cook et al.

(10) Patent No.: US 11,319,234 B2
(45) Date of Patent: May 3, 2022

(54) APPARATUS AND METHOD FOR FORMING A GLASS ARTICLE

(71) Applicant: CORNING INCORPORATED, Corning, NY (US)

(72) Inventors: Mark Alan Cook, Painted Post, NY (US); Zagorka Dacic Gaeta, Ithaca, NY (US); Sung-Hwan Lee, Xitun Dist (TW); Daniel Arthur Nolet, Danville, KY (US); Guido Peters, Bath, NY (US)

(73) Assignee: Corning Incorporated, Corning, NY (US)

( * ) Notice: Subject to any disclaimer, the term of this patent is extended or adjusted under 35 U.S.C. 154(b) by 304 days.

(21) Appl. No.: 16/328,068

(22) PCT Filed: Aug. 24, 2017

(86) PCT No.: PCT/US2017/048302
§ 371 (c)(1),
(2) Date: Feb. 25, 2019

(87) PCT Pub. No.: WO2018/039398
PCT Pub. Date: Mar. 1, 2018

(65) Prior Publication Data
US 2020/0180990 A1 Jun. 11, 2020

Related U.S. Application Data

(60) Provisional application No. 62/379,822, filed on Aug. 26, 2016.

(51) Int. Cl.
*C03B 5/185* (2006.01)
*C03B 3/00* (2006.01)
(Continued)

(52) U.S. Cl.
CPC ............. *C03B 5/185* (2013.01); *C03B 3/005* (2013.01); *C03B 5/03* (2013.01); *C03B 5/2353* (2013.01); *C03B 17/064* (2013.01)

(58) Field of Classification Search
CPC ............ C03B 3/005; C03B 5/03; C03B 5/185
See application file for complete search history.

(56) References Cited

U.S. PATENT DOCUMENTS 1,906,695 A 5/1933 Lufkin
3,842,180 A * 10/1974 Froberg ............... H05B 3/0023
373/40
(Continued)

FOREIGN PATENT DOCUMENTS

CN 101784492 A 7/2010
CN 102884012 A 1/2013
(Continued)

OTHER PUBLICATIONS

International Search Report and Written Opinion of the International Searching Authority; PCT/US2017/048302; dated Nov. 15, 2017; 19 Pages; European Patent Office.
(Continued)

*Primary Examiner* — Lisa L Herring (57) ABSTRACT

A melting apparatus is disclosed, the melting apparatus including a melting vessel with a back wall, a front wall, a first side wall, a second side wall and a longitudinal centerline extending therebetween and a width between the first and second side walls orthogonal to the centerline. The melting vessel further includes a first feed screw including a first axis of rotation and a second feed screw including a second axis of rotation, the first axis of rotation positioned between the longitudinal centerline and the first side wall and the second axis of rotation positioned between the longitudinal centerline and the second side wall. The positions of either one or both the first and second axes of
(Continued)

rotation are located from a respective side wall a distance that is equal to or less than about 15% of the width of the melting vessel.

25 Claims, 6 Drawing Sheets

(51) Int. Cl.
*C03B 5/03* (2006.01)
*C03B 5/235* (2006.01)
*C03B 17/06* (2006.01)

(56) References Cited

U.S. PATENT DOCUMENTS

| | | | | |
|---|---|---|---|---|
| 3,885,945 A | * | 5/1975 | Rees | ............ C03B 5/185 65/135.7 |
| 3,941,576 A | | 3/1976 | Welton | |

FOREIGN PATENT DOCUMENTS

| | | | | |
|---|---|---|---|---|
| JP | 50-133214 A | | 10/1975 | |
| JP | 11100214 A | * | 4/1999 | ........... C03B 5/2353 |
| JP | 2010222217 A | | 10/2010 | |
| WO | WO-0000440 A1 | * | 1/2000 | ............... C03B 3/00 |
| WO | WO-0179125 A2 | * | 10/2001 | ............... C03B 3/00 |
| WO | 2012108364 A1 | | 8/2012 | |
| WO | WO-2012108364 A1 | * | 8/2012 | ............ C03B 3/026 |

OTHER PUBLICATIONS

Chinese Patent Application No. 201780052502.0, Office Action dated Jul. 5, 2021, 11 pages (5 pages of English Translation and 6 pages of Original Document), Chinese Patent Office.

Japanese Patent Application No. 2019-511495, Office Action dated May 27, 2021, 8 pages (4 pages of English Translation and 4 pages of Original Document), Japanese Patent Office.

Liang, "Practical Guide for Design and Operation of Glass Kiln", China Light Industry Press, 1994, pp. 48-49. (original copy only).

Wei et al., "Glass Production Process and Technology", Wuhan University of Science and Technology Press, 2013, p. 309. (original copy only).

* cited by examiner

APPARATUS AND METHOD FOR FORMING A GLASS ARTICLE

CROSS-REFERENCE TO RELATED APPLICATIONS

The application claims the benefit of priority under 35 U.S.C. § 371 of International Application No. PCT/US17/48302, filed on Aug. 24, 2017, which claims the benefit of priority of U.S. Provisional Application Ser. No. 62/379,822 filed on Aug. 26, 2016 the contents of which are relied upon and incorporated herein by reference in their entirety as if fully set forth below.

BACKGROUND

Field

The present invention relates generally to apparatus and methods for forming a glass article from a molten material, and in particular melting apparatus and methods for reducing inhomogeneity in the molten material.

Technical Background

The large scale manufacture of glass articles, for example glass sheets used in the manufacture of display devices, begins with the melting of raw materials to produce a viscous molten material that can be formed into the glass article in a downstream forming process. Raw materials, including, for example, various metal oxides, modifiers, fluxes and fining agents, can be mixed and charged to a melting furnace where the raw materials are heated to a temperature at which the materials dissolve, e.g., melt. Insufficient or uneven dissolution can result in anomalies in the finished product ranging from particles (stones) to variations in viscosity that may manifest as small thickness variations in the finished article, often on the order of nanometers. If the finished product is a glass sheet, for example a glass sheet formed from a glass ribbon drawn in a glass drawing process, the resultant thickness variations can be readily visible to an observer. If the glass sheet is to be used in a display application, such as for a display panel or a cover glass, such an observable phenomenon is unacceptable.

SUMMARY

The design of future melting vessels is often predicated on the design of well-performing predecessor melting vessels. That is, when constructing a new melting vessel, a design of the new melting vessel is often heavily influenced by the design of previous melting vessels that have historically performed well for various process characteristics or product attributes. These characteristics and/or attributes may be important to the manufacturing process, for example reduced time or cost, and/or important to purchasers and users of the finished product, such as product with reduced defects. However, from time to time it may be necessary to deviate from historical melting vessel construction, in which case the designer may have little guidance to rely on. This lack of historical precedence may result in a significant cost associated with construction of the new melting vessel, only to find the melting vessel fails to perform as expected for the one or more process characteristics or product attributes deemed important. The present disclosure describes apparatus and methods for designing a melting vessel configured to produce a molten material, for example molten glass suitable for the manufacture of high quality optical glass, such as glass sheets for use in display devices. More particularly, the present disclosure describes apparatus and methods that may reduce or minimize the occurrence of optical defects in finished glass articles related to homogeneities in the molten glass.

Accordingly, a melting apparatus is disclosed, the apparatus including a melting vessel comprising a back wall, a front wall, a first side wall and a second side wall, the melting vessel further comprising a longitudinal centerline extending from the back wall to the front wall and a width extending between an inside surface of the first side wall and an inside surface of the second side wall, the width orthogonal to the longitudinal centerline. The melting vessel may be, for example, a refractory melting vessel. The apparatus may also include a first feed screw comprising a first axis of rotation, the first feed screw rotatably mounted in a first screw feeder and configured to feed a first raw material into the melting vessel. In some embodiments, a distance between the first axis of rotation and the inside surface of the first side wall on a line perpendicular to the first axis of rotation is equal to or less than about 15% of the width of the melting vessel. The line perpendicular to the first axis of rotation may be located, for example, at an inside surface of the back wall.

In some embodiments, the apparatus may further comprise a second feed screw comprising a second axis of rotation, the second feed screw rotatably mounted in a second screw feeder and configured to feed a second raw material into the melting vessel, and wherein a distance between the second axis of rotation and the inside surface of the second side wall on a line perpendicular to the second axis of rotation is equal to or less than about 15% of the width of the melting vessel. The second raw material may be, for example the same raw material as the first raw material, although in further embodiments, the second raw material may be a different raw material than the first raw material. The line perpendicular to the second axis of rotation can be located, for example, at an inside surface of the back wall.

In some embodiments, the first axis of rotation may be located equal to or less than about 40 centimeters from the inside surface of the first side wall, for example equal to or less than about 38 centimeters. In some embodiments, the second axis of rotation may be located equal to or less than about 40 centimeters from the inside surface of the second side wall, for example equal to or less than about 38 centimeters.

In some embodiments, the first axis of rotation is substantially parallel with the first side wall. In some embodiments, the second axis of rotation is substantially parallel with the second side wall.

In some embodiments, the second axis of rotation is substantially parallel to the first axis of rotation. In some embodiments, the first axis of rotation and the second axis of rotation are equidistant from the longitudinal centerline.

The apparatus may further comprise a plurality of electrodes exposed to an interior of the melting vessel. For example, the melting vessel may further comprise a bottom wall, wherein the plurality of electrodes can extend into the interior of the melting vessel through the bottom wall, although in further embodiments the electrodes may extend, either alternatively or in addition, through one or both of the first and second side walls. For example, each electrode of the plurality of electrodes may extend into the interior of the melting vessel at least about 15 centimeters, for example, at least about 15 centimeters from the bottom wall. In some embodiments, the plurality of electrodes may comprise molybdenum, although in further embodiments the electrodes may comprise another suitable electrically conductive material, such as tin, for example tin oxide.

In some embodiment, the melting vessel may be an electrically boosted gas fired melting vessel and further comprise a plurality of combustion burners exposed to an interior of the melting vessel through one or both of the first and second side walls.

In another embodiment, a method for charging a melting vessel is described, the method comprising feeding raw material into an interior of the melting vessel using a first feed screw comprising a first axis of rotation, the melting vessel comprising a back wall, a front wall, a first side wall and a second side wall, the melting vessel further including a longitudinal centerline extending from the back wall to the front wall and a width extending between an inside surface of the first side wall and an inside surface of the second side wall, the width orthogonal to the longitudinal centerline. The melting vessel may be, for example, a refractory melting vessel. The first feed screw may be rotatably mounted in a first screw feeder. A distance between the first axis of rotation and the inside surface of the first side wall on a line perpendicular to the first axis of rotation may be equal to or less than about 15% of the width of the melting vessel.

The method may further comprise feeding raw material into the interior of the melting vessel with a second feed screw comprising a second axis of rotation, and wherein a distance between the second axis of rotation and an inside surface of the second side wall on a line perpendicular to the second axis of rotation is equal to or less than about 15% of the width of the melting vessel. The second feed screw may be rotatably mounted in a second screw feeder.

In some embodiments, the first axis of rotation may be located equal to or less than about 40 centimeters from the inside surface of the first side wall. In some embodiments, the second axis of rotation may be located equal to or less than about 40 centimeters from the inside surface of the second side wall.

In some embodiments, the heating comprises establishing an electric current between a plurality of electrodes in contact with a molten material contained within the melting vessel. In some embodiments, the plurality of electrodes can extend into the molten material through a bottom wall of the melting vessel. For example, each electrode of the plurality of electrodes may extend into the molten material a distance of at least 15 centimeters. In some embodiments, the plurality of electrodes may comprise molybdenum, although in further embodiments, the electrodes may comprise tin, for example tin oxide.

The method may further comprise heating the molten material using a plurality of combustion burners exposed to the interior of the melting vessel through the first and second side walls.

In some embodiments, the melting vessel may be heated with a combination of electric current and combustion burners, wherein a total amount of energy introduced into the molten material by the electric current and the combustion burners is equal to or greater than about 20% by the electric current and equal to or less than about 80% by the combustion burners.

The method may further comprise drawing the molten material into a glass sheet comprising an average cord contrast less than about 0.25%.

In still another embodiment, a method for forming a glass article is disclosed, the method comprising forming a molten material in a melting vessel, the melting vessel comprising a back wall, a front wall, a first side wall and a second side wall, the melting vessel further including a longitudinal centerline extending from the back wall to the front wall and a width extending between an inside surface of the first side wall and an inside surface of the second side wall, the width orthogonal to the longitudinal centerline. The molten material may be formed, for example, by heating raw materials in the melting vessel. The method may further comprise heating the molten material (thereby maintaining a temperature of the molten material at a predetermined temperature) and feeding a first raw material into an interior of the melting vessel with a first feed screw comprising a first axis of rotation. A distance between the first axis of rotation and the inside surface of the first side wall at an inside surface of the back wall may be equal to or less than about 15% of the width of the melting vessel. The method may still further comprise delivering the molten material to a forming apparatus and forming the molten material into a glass article.

In some embodiments, method may include feeding a second raw material into the interior of the melting vessel with a second feed screw comprising a second axis of rotation, and wherein a distance between the second axis of rotation and the inside surface of the second side wall at an inside surface of the back wall may be equal to or less than about 15% of the width of the melting vessel. In some embodiments, the first and second raw materials are the same.

In some embodiments, the first axis of rotation and the second axis of rotation may be located equal to or less than about 40 centimeters from the inside surfaces of the first and second side walls, respectively.

In some embodiments, the heating may comprise establishing an electric current between a plurality of electrodes in contact with the molten material.

The plurality of electrodes, for example, may comprise molybdenum, although in further embodiments, the electrodes may comprise tin, for example tin oxide.

In some embodiments, the method may further comprise heating the molten material using a plurality of combustion burners exposed to an interior of the melting vessel through the first and second side walls, wherein a total amount of energy introduced into the molten material by the electric current and the combustion burners is equal to or greater than about 20% by the electric current and equal to or less than about 80% by the combustion burners.

In some embodiments, the glass article may be a glass ribbon, for example a glass ribbon drawn from a forming body.

In yet another embodiment, a method for forming a glass article is described, comprising forming a molten material in a melting vessel, the melting vessel comprising a back wall, a front wall, a first side wall, and a second side wall, the melting vessel further including a longitudinal centerline extending from the back wall to the front wall and a width extending between an inside surface of the first side wall and an inside surface of the second side wall, the width orthogonal to the longitudinal centerline. The method may comprise heating the molten material, the heating forming a convection cell within the molten material comprising a first flow of molten material flowing in a first direction toward the first side wall relative to the longitudinal centerline at a first flow velocity, the first flow velocity varying as a function of distance from the longitudinal centerline. The method may still further comprise calculating a first distance from an inside surface of the first side wall along the first direction where the first flow velocity is at a maximum, feeding a first raw material into an interior of the melting vessel with a first feed screw comprising a first axis of rotation, wherein a distance between the first axis of rotation and the inside surface of the first side wall is substantially equal to the calculated first distance, and forming a glass article with the molten material. For example, the distance between the first axis of rotation and the inside surface of the first side wall can be within 10% of the first distance. In some embodiments, the distance between the first axis of rotation and the inside surface of the first side wall can be equal to or less than about 15% of the width of the melting vessel. In some embodiments, the distance between the first axis of rotation and the first side wall can be equal to or less than about 40 centimeters, for example equal to or less than about 38 centimeters.

In some embodiments, the convection cell may comprise a second flow of the molten material flowing in a second direction toward the second side wall relative to the longitudinal centerline at a second flow velocity, the second flow velocity varying as a function of distance from the longitudinal centerline. Accordingly, the method may further comprising calculating a second distance from an inside surface of the second side wall along the second direction where the second flow velocity is at a maximum, feeding a second raw material into the interior of the melting vessel with a second feed screw comprising a second axis of rotation and wherein a distance between the second axis of rotation and the inside surface of the second side wall is substantially equal to the calculated second distance.

For example, the distance between the second axis of rotation and the inside surface of the second side wall can be within 10% of the second distance. In some embodiments, the distance between the second axis of rotation and the inside surface of the second side wall can be equal to or less than about 15% of the width of the melting vessel. In some embodiments, the distance between the second axis of rotation and the second side wall can be equal to or less than about 40 centimeters, for example equal to or less than about 38 centimeters.

In some embodiments, a total amount of energy introduced into the molten material by the heating is equal to or greater than about 20% by an electric current and equal to or less than about 80% by combustion burners.

In yet still another embodiment, a melting apparatus is described, the melting apparatus including a melting vessel comprising a back wall, a front wall, a first side wall and a second side wall, the melting vessel further comprising a longitudinal centerline extending from the back wall to the front wall and a width extending between an inside surface of the first side wall and an inside surface of the second side wall, the width orthogonal to the longitudinal centerline. The melting vessel may be, for example, a refractory melting vessel. The apparatus may further comprise a first feed port positioned in the back wall between the longitudinal centerline and the first side wall and a second feed port positioned in the back wall between the longitudinal centerline and the second side wall. The apparatus may include a first feed screw comprising a first axis of rotation and a second feed screw comprising a second axis of rotation, the first and second feed screws configured to feed raw material into the melting vessel through the first and second feed ports, respectively. In some embodiments, a distance along the back wall between the first axis of rotation and the inside surface of the first side wall and a distance along the back wall between the second axis of rotation and the inside surface of the second side wall are both equal to or less than about 15% of the width of the melting vessel.

In some embodiments, the first axis of rotation may be substantially parallel with the first side wall. In some embodiments, the second axis of rotation may be substantially parallel with the second side wall. In some embodiments, the second axis of rotation is substantially parallel with the first axis of rotation. In some embodiments, the first axis of rotation and the second axis of rotation are equidistant from the longitudinal centerline.

The apparatus may further comprise a plurality of electrodes exposed to an interior of the melting vessel. For example, the melting vessel may comprise a bottom wall, wherein the plurality of electrodes can extend into the interior of the melting vessel through the bottom wall, although in further embodiments, either alternatively or in addition, the electrodes may extend into the melting vessel through one or both of the first and second side walls. Each electrode of the plurality of electrodes may extend into the interior of the melting vessel a distance of at least about 15 cm from the bottom of the melting vessel.

In some embodiments, the plurality of electrodes may comprise molybdenum, although in further embodiments the plurality of electrodes may comprise another electrically conductive material such as tin, for example tin oxide.

In some embodiments, the melting vessel may also comprise a plurality of combustion burners exposed to the interior of the melting vessel through one or both of the first and second side walls.

In some embodiments, the first axis of rotation and the second axis of rotation can be located equal to or less than about 40 centimeters from the inside surfaces of the first and second side walls, respectively, for example equal to or less than about 38 centimeters, and in some embodiments the first axis of rotation and the second axis of rotation may be located equal to or less than about 28 centimeters from the inside surfaces of the first and second side walls, respectively. For example, in a range from about 5 cm to about 38 cm, such as in a range from about 5 cm to about 28 cm, in a range from about 5 cm to about 20 cm, in a range from about 5 cm to about 15 cm or in a range from about 5 cm to about 10 cm.

Additional features and advantages of the embodiments disclosed herein will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments intended to provide an overview or framework for understanding the nature and character of the claimed invention. The accompanying drawings are included to provide further understanding, and are incorporated into and constitute a part of this specification. The drawings illustrate various embodiments of the disclosure, and together with the description, serve to explain the principles and operations thereof.

DETAILED DESCRIPTION

Reference will now be made in detail to the embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the terms "batch" and "raw material" are synonymous and used interchangeably. As used herein, the terms "molten material" and "melt" (employed as a noun) are synonymous and used interchangeably.

Figure 1:
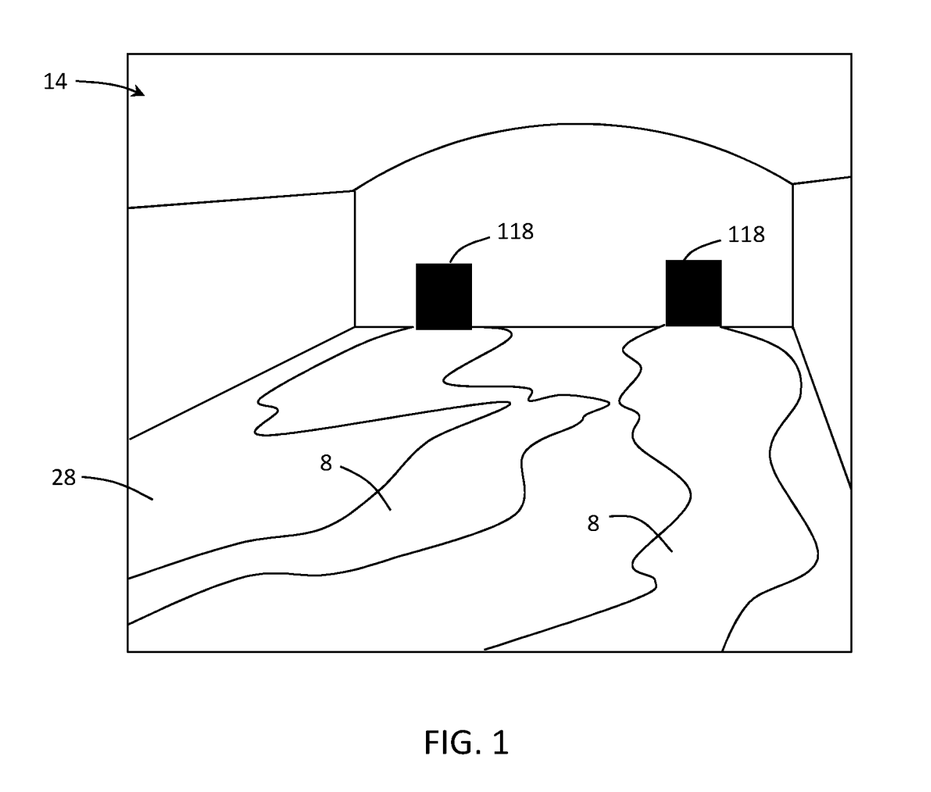
FIG. 1 illustrates an inside of a melting vessel showing molten material and batch snakes thereon extending from feed ports in the melting vessel.

Those skilled in the art of melting raw materials to produce a molten material, for example molten glass, will appreciate that convection currents developed within the molten material serve at least several objectives, e.g., to distribute heat energy through the molten material and mixing the molten material. The convection currents may be developed from heat energy input into the melt from combustion burners, but in electrically boosted processes heat energy may be input both from combustion burners and also from electrodes positioned within the melt through at least one of the walls of the melting vessel. It has been discovered that changes to the geometry of the melting vessel may also result in a change to the homogeneity of the molten material flowing from the melting vessel. Process data and analysis have shown a strong correlation between homogeneity upsets and melt surface conditions as measured, for example, by crown temperatures, raw material filling stability, left-to-right fill balance, and other process characteristics. Subsequent analysis of batch filling and batch flow patterns on the surface of the melt as observed via high speed time lapse video of the system has shown that improved performance (e.g., melting efficiency and product quality) can be correlated to batch fill patterns where the batch was consistently positioned toward the outside of the melting vessel and the center surface of the melt remained essentially clear of the batch patterns. Observation has shown that batch patterns on the surface of the melt (often described as "snakes" due to their sometimes undulating and varying patterns as the batch traverses outward from the batch pile) typically would meander along the melting vessel as well as across the melting vessel in highly irregular and variable ways. FIG. 1 illustrates exemplary batch snakes 8 originating from a pair of screw feeders positioned in the back wall of a melting vessel that feed batch material into the interior of the melting vessel via feed ports 118. By mapping surface batch patterns to homogeneity performance as manifested in a finished article, for example glass substrates (e.g., glass sheets), more regular patterns were found to be associated with better performance, and especially those batch patterns where the batch snakes were closely positioned next to the side walls of the melting vessel, only turning to the center of the melt near the melt hot spot downstream of the screw feeder.

Without wishing to be held to theory, it has been hypothesized that inhomogeneities that successfully pass through the melting vessel originate from batch snakes that pass the hot spot at or near the centerline of the melting vessel and are subsequently entrained into the flow of molten material exiting the melting vessel. It is believed that raw material at or near the centerline of the melting vessel does not spend sufficient time in the hot melt to fully react or dissolve. The resultant molten material may thus contain, for example, regions of high silica concentration and/or other inhomogeneities. If a small region of inhomogeneous molten material is able to survive the mixing action of the melting and delivery process, this material may then enter the draw process, which distributes the inhomogeneity (e.g., viscosity difference) into the drawn ribbon as a repeating pattern of nanometer-scale thickness deviations. The human eye is inherently sensitive to these types of diffraction or lensing patterns. Such a pattern defect is described as "cord".

Further analysis of mathematical models for various melting vessel designs has shown that lateral convection (whereby a sideways force is applied to the underside of the batch snakes as a result of weak coupling with the melt surface) was significantly higher in some melting vessel designs than others. In particular, it was found that the location of the screw feeders in the back wall of the melting vessel could have a direct impact on the magnitude of cord present in the resultant finished article.

Figure 2:
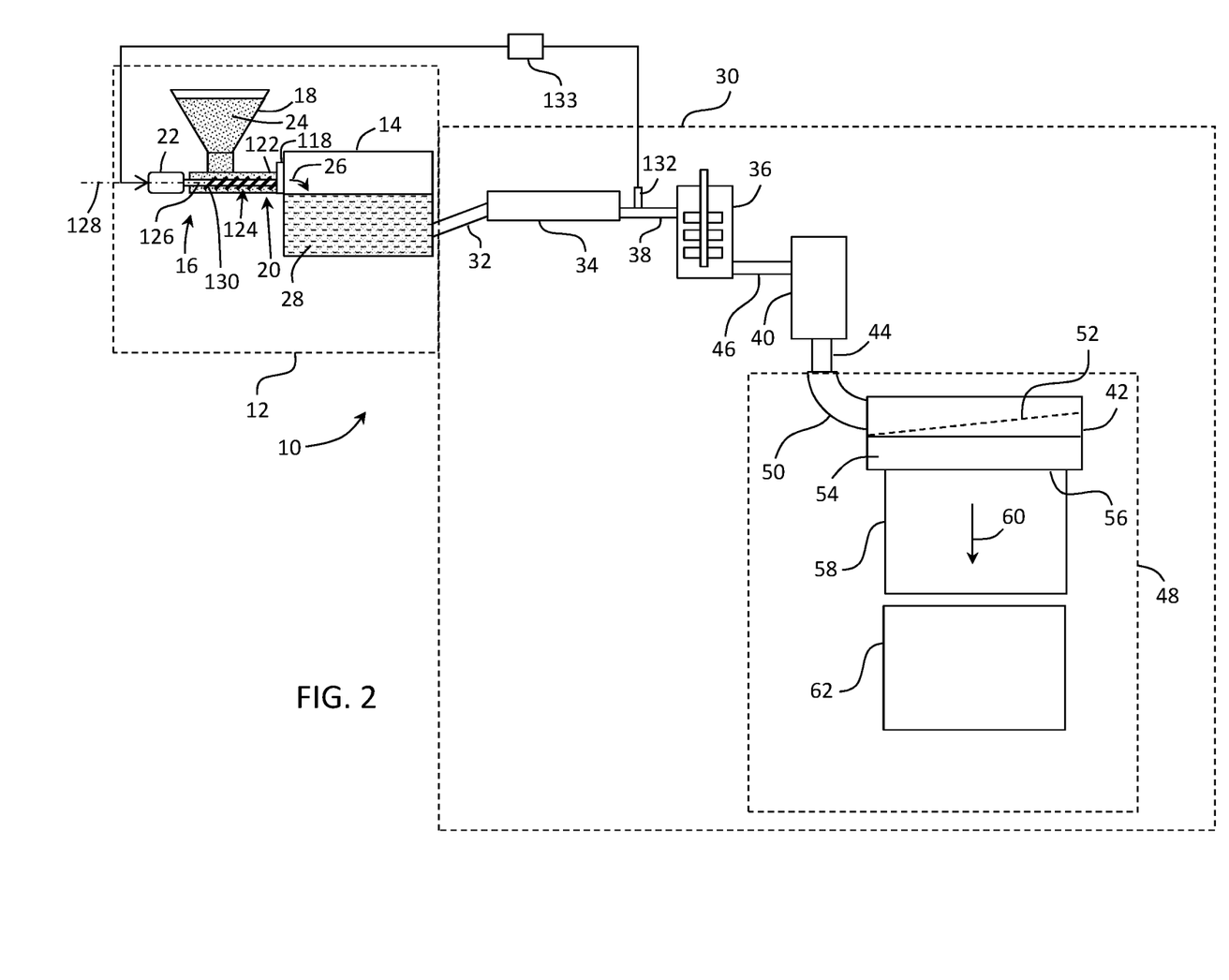
FIG. 2 is a elevational view of an exemplary glass making apparatus including a melting vessel for melting raw materials to form a molten material.

Shown in FIG. 2 is an exemplary glass manufacturing apparatus 10. In some examples, the glass manufacturing apparatus 10 can comprise a melting furnace 12 that can include a melting vessel 14. Melting vessel 14 is typically formed from a refractory material, such as a refractory ceramic material, for example a refractory ceramic material comprising alumina or zirconia. In some examples, melting vessel 14 may be constructed from refractory ceramic bricks.

In addition to melting vessel 14, melting furnace 12 can optionally include one or more additional components such as heating elements (e.g., combustion burners and/or electrodes) configured to heat raw material and convert the raw material into molten glass. For example, melting furnace 12 may include an electrically boosted gas fired melting vessel, wherein energy is added to the raw materials and/or melt through both combustion burners (burning a combustible fuel, such as natural gas) and by direct heating, wherein an electric current is passed through the melt and/or raw material, thereby adding energy via Joule heating of the melt and/or raw material and subsequent conductive heating of raw material introduced to the melting vessel. As used herein, an electrically boosted melting vessel is a melting vessel wherein the amount of energy imparted to the melt via direct heating (Joule heating) is in a range from about 20% to 80% of the total amount of energy added to the melt via combined combustion and electric current, for example equal to or greater than about 30%, such as equal to or greater than about 40%, equal to or greater than about 60%, or equal to or greater than 80%, including all ranges and subranges therebetween.

In further examples, melting furnace 12 may include thermal management devices (e.g., insulation components) that reduce heat loss from the melting vessel. In still further examples, melting furnace 12 may include electronic devices and/or electromechanical devices that facilitate melting of the raw material into a glass melt. Still further, melting furnace 12 may include support structures (e.g., support chassis, support member, etc.) or other components.

In some examples, melting furnace 12 may be incorporated as a component of a glass manufacturing apparatus configured to fabricate a glass article, for example a glass ribbon of an indeterminate length, although in further embodiments, the glass manufacturing apparatus may be configured to form other glass articles without limitation, such as glass rods, glass tubes, glass envelopes (for example, glass envelopes for lighting devices (e.g., light bulbs) and glass lenses. In some examples, the melting furnace may be incorporated as a component of a glass manufacturing apparatus comprising a slot draw apparatus, a float bath apparatus, a down draw apparatus (e.g., a fusion down draw apparatus), an up-draw apparatus, a pressing apparatus, a rolling apparatus, a tube drawing apparatus or any other glass manufacturing apparatus that would benefit from aspects disclosed herein. By way of example, FIG. 2 schematically illustrates melting furnace 12 as a component of a fusion down draw glass manufacturing apparatus 10 for fusion drawing a glass ribbon for subsequent processing into individual glass sheets.

Glass manufacturing apparatus 10 (e.g., fusion down draw apparatus 10) can optionally include an upstream glass manufacturing apparatus 16 upstream of melting vessel 14 relative to a flow direction of molten material from the melting vessel. In some examples, a portion of, or the entire upstream glass manufacturing apparatus 16, may be incorporated as part of melting furnace 12.

As shown in the illustrated embodiment, the upstream glass manufacturing apparatus 16 can include a raw material storage bin 18, a raw material delivery device 20, e.g., a screw feeder, and a motor 22 connected to the raw material delivery device. Raw material storage bin 18 may be configured to store a quantity of raw material 24 that can be fed into melting vessel 14 of melting furnace 12 through one or more feed ports, as indicated by arrow 26. Raw material 24 may comprise one or more glass forming metal oxides and one or more modifying agents. In some examples, raw material delivery device 20 can be powered by motor 22 such that raw material delivery device 20 delivers a predetermined amount of raw material 24 from raw material storage bin 18 to melting vessel 14. In further examples, motor 22 can power raw material delivery device 20 to introduce raw material 24 at a controlled rate based on a level of molten material sensed downstream from melting vessel 14. Raw material 24 within melting vessel 14 can thereafter be heated to form molten raw material 28. Typically, in an initial melting step, raw material can be added to the melting vessel as a pulverant material, for example comprising various "sands". Raw material 24 may also include scrap glass (i.e., cullet) from previous operations. Combustion burners are used to begin the melting process. In an electrically boosted melting process, once the electrical resistance of the raw material is sufficiently reduced (e.g., when the raw material becomes sufficiently molten), electric boost is begun by developing an electric potential between electrodes positioned in contact with the raw material and/or melt, thereby establishing an electric current through the raw material and/or melt.

Glass manufacturing apparatus 10 can also optionally include a downstream glass manufacturing apparatus 30 positioned downstream from melting vessel 14 relative to a flow direction of molten material leaving the melting vessel 14. In some examples, a portion of downstream glass manufacturing apparatus 30 may be incorporated as part of melting furnace 12. For example, in some instances, first connecting conduit 32 discussed below, or other portions of the downstream glass manufacturing apparatus 30, may be incorporated as part of the glass melting furnace 12. Elements of the downstream glass manufacturing apparatus, including first connecting conduit 32, may be formed from a precious metal. Suitable precious metals include platinum group metals selected from the group of metals consisting of platinum, iridium, rhodium, osmium, ruthenium and palladium (the "platinum group" metals), or alloys thereof. For example, downstream components of the glass manufacturing apparatus may be formed from a platinum-rhodium alloy including from about 70% to about 90% by weight platinum and about 10% to about 30% by weight rhodium. However, other suitable metals can include molybdenum, palladium, rhenium, tantalum, titanium, tungsten and alloys thereof.

Downstream glass manufacturing apparatus 30 can include a first conditioning (i.e. processing) vessel, such as fining vessel 34, located downstream from melting vessel 14 and coupled to melting vessel 14 by way of the above-referenced first connecting conduit 32. In some examples, molten material 28 may be gravity fed from melting vessel 14 to fining vessel 34 by way of first connecting conduit 32. For instance, gravity may drive molten material 28 through an interior pathway of first connecting conduit 32 from melting vessel 14 to fining vessel 34. It should be understood, however, that other conditioning vessels may be positioned downstream of melting vessel 14, for example between melting vessel 14 and fining vessel 34. In some embodiments, a conditioning vessel may be employed between the melting vessel and the fining vessel wherein molten material from a primary melting vessel is further heated in a secondary vessel to continue the melting process, or cooled to a temperature lower than the temperature of the molten material in the primary melting vessel before entering the fining vessel.

Bubbles may be removed from molten material 28 within fining vessel 34 by various techniques. For example, raw material 24 may include multivalent compounds (i.e. fining agents) such as tin oxide that, when heated, undergo a chemical reduction reaction and release oxygen. Other suitable fining agents include without limitation arsenic, antimony, iron and cerium. Molten material in fining vessel 34 is heated to a temperature greater than the temperature of the molten material in the melting vessel, thereby heating the fining agent. Oxygen bubbles produced by the temperature-induced chemical reduction of the fining agent(s) rise through the molten material within the fining vessel, wherein gases in the melt produced in the melting vessel can coalesce or diffuse into the oxygen bubbles produced by the fining agent. The enlarged gas bubbles with increased buoyancy can then rise to a free surface of the molten glass within the fining vessel and thereafter be vented out. The oxygen-containing bubbles can further induce mechanical mixing of the molten material in the fining vessel as they rise through the melt.

The downstream glass manufacturing apparatus 30 can further include another conditioning vessel, such as a mixing apparatus 36 for mixing the molten material that flows downstream from fining vessel 34. Mixing apparatus 36 can be used to provide a homogenous melt composition, thereby minimizing chemical or thermal inhomogeneities that may otherwise exist within the fined molten glass exiting the fining vessel. As shown, fining vessel 34 may be coupled to mixing apparatus 36 by way of a second connecting conduit 38. In some examples, molten material 28 may be gravity fed from the fining vessel 34 to mixing apparatus 36 by way of second connecting conduit 38. For instance, gravity may drive molten material 28 through an interior pathway of second connecting conduit 38 from fining vessel 34 to mixing apparatus 36. It should be noted that while mixing apparatus 36 is shown downstream of fining vessel 34, mixing apparatus 36 may be positioned upstream from fining vessel 34 in other embodiments. In still other embodiments, downstream glass manufacturing apparatus 30 may include multiple mixing apparatus, for example a mixing apparatus upstream from fining vessel 34 and a mixing apparatus downstream from fining vessel 34. These multiple mixing apparatus may be of the same design, or they may be of a different design from one another.

Downstream glass manufacturing apparatus 30 can further include another conditioning vessel such as delivery vessel 40 that may be located downstream from mixing apparatus 36. Delivery vessel 40 may condition molten material 28 to be fed into a downstream forming device. For instance, delivery vessel 40 can act as an accumulator and/or flow controller to adjust and provide a consistent flow of molten material 28 to forming body 42 by way of exit conduit 44. As shown, mixing apparatus 36 may be coupled to delivery vessel 40 by way of third connecting conduit 46. In some examples, molten material 28 may be gravity fed from mixing apparatus 36 to delivery vessel 40 by way of third connecting conduit 46. For instance, gravity may drive molten material 28 through an interior pathway of third connecting conduit 46 from mixing apparatus 36 to delivery vessel 40.

Downstream glass manufacturing apparatus 30 can further include forming apparatus 48 comprising the above-referenced forming body 42, including inlet conduit 50. Exit conduit 44 can be positioned to deliver molten material 28 from delivery vessel 40 to inlet conduit 50 of forming apparatus 48. Forming body 42 in a fusion down draw glass making apparatus can comprise a trough 52 positioned in an upper surface of the forming body and a pair of converging forming surfaces 54 that converge in a draw direction along a bottom edge (root) 56 of the forming body. Molten material delivered to the forming body trough via delivery vessel 40, exit conduit 44 and inlet conduit 50 overflows the walls of the trough and descends along the converging forming surfaces 54 as separate flows of molten material. The separate flows of molten material join below and along the root to produce a single ribbon of glass 58 that is drawn in a draw direction 60 from root 56 by applying tension to the glass ribbon, such as by gravity, edge rolls and pulling rolls (not shown), to control the dimensions of the glass ribbon as the glass cools and a viscosity of the glass increases. Accordingly, glass ribbon 58 goes through a visco-elastic transition and acquires mechanical properties that give glass ribbon 58 stable dimensional characteristics. Glass ribbon 58 may in some embodiments be separated into individual glass sheets 62 by a glass separation apparatus (not shown) in an elastic region of the glass ribbon, although in further embodiments, the glass ribbon may be wound on spools.

Figure 3:
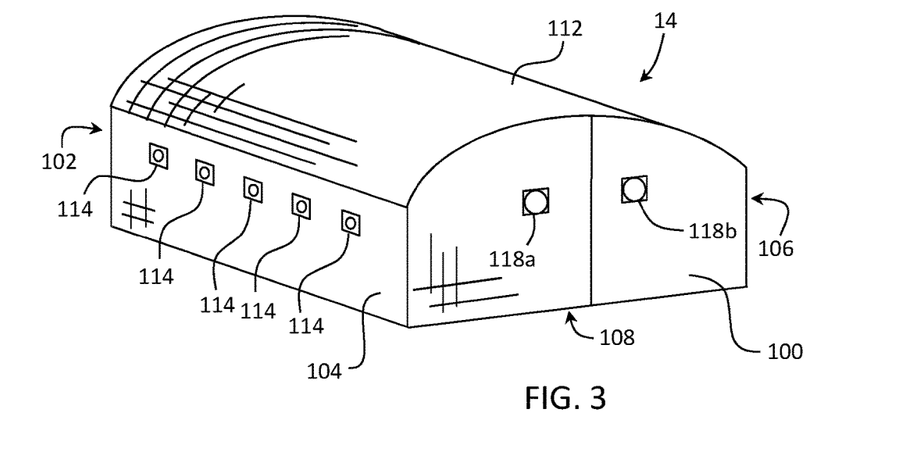
FIG. 3 is a perspective view of a melting vessel suitable for use in the glass making apparatus of FIG. 2.

Referring now to FIGS. 2 and 3, melting vessel 14 is shown comprising back wall 100, front wall 102, first side wall 104, second side wall 106 and bottom wall 108 that form basin 110, the walls arranged to hold molten material 28 within basin 110 during the melting process. Melting vessel 14 is typically rectangular in shape having top wall 112, wherein second side wall 106 is parallel to first side wall 104, and back wall 100 is parallel with front wall 102. Melting vessel 14 comprises a length L extending longitudinally from an inside surface of back wall 100 to an inside surface of front wall 102, and a width W extending orthogonal to length L, i.e., in a lateral direction from the inside surface of first side wall 104 to the inside surface of the opposing second side wall 106. That is, length L and width W define the length and width of basin 110. A longitudinal centerline CL extends along the length of the melting vessel and bisects the melting vessel (i.e., centerline CL is equidistance from both first and second side walls 104, 106).

Top wall 112, typically, although not necessarily arched, extends over basin 110, and may be referred to as the crown. Melting vessel 14 may further comprise a plurality of burner ports 114 positioned in an upper portion of first side wall 104 and second side wall 106, burner ports 114 including a plurality of respective combustion burners 116 positioned such that flames produced by the combustion burners extend over the molten material within the melting vessel, although in further embodiments, submerged combustion may be provided either in the alternative or in addition to overhead combustion burners.

Melting vessel 14 may further include at least one feed port 118 opening through back wall 100, wherein raw material delivery device 20 may be configured to deliver raw material 24 to the basin through the at least one feed port for processing into a molten material (e.g., molten glass). In further embodiments, back wall 100 may include multiple feed ports 118 and multiple raw material delivery devices 20, for example two feed ports 118a, 118b and two batch delivery devices 20a, 20b, although in further embodiments, more than two feed ports and more than two raw material delivery devices may be provided. Each raw material delivery device 20 may charge the same raw material into the melting vessel, or each raw material delivery device may charge a different raw material into the melting vessel, for example, a first raw material delivery device 20 may charge a first raw material and a second raw material delivery device 20 may charge a second raw material. The raw material charged by one raw material delivery device need not be charged at the same rate as a second raw material delivery device.

Melting vessel 14 may further include a plurality of electrodes 120 extending into basin 110 through one or more walls of the melting vessel and configured to heat molten material within the melting vessel, for example through bottom wall 108 as shown in FIG. 3, the electrodes in electrical communication with an electrical power source (not shown), although in further embodiments, either alternatively or in addition, a plurality of electrodes 120 may extend into basin 110 through first side wall 104 and/or second side wall 106. The electrodes may extend at least 15 centimeters into the molten material. In some embodiments, the heat energy added to the molten material in basin 110 by electrodes 116 (X) compared to the heat energy added to the molten material via burners 116 (Y) may be in a ratio X:Y where X is in a range from about 20% to about 80% and Y is in a range from about 20% to about 80%, including all ranges and subranges therebetween. For example, the ratio of heat energy added to the molten material in basin 110 via electrodes 120 compared to burners 116 may, for example, be 20%:80%, 30%:70%, 40%:60%, 50%/50%, 60%/40%, 70%/30% or 80%/20%, including all ratios therebetween.

Thermocouples (not shown) may be embedded in any one or more of the various walls of the melting vessel. For example, thermocouples embedded in bottom wall 108 can provide bottom temperatures of the molten material, such as longitudinally along the centerline of the melting vessel, while thermocouples embedded in the side walls can provide side temperatures of the melt. Thermocouples positioned in the top wall can provide crown temperatures. Temperature readings obtained through the various thermocouples can be used to monitor and evaluate performance of the melting operation.

Returning to FIG. 2, each raw material delivery device 20 comprises a hollow barrel 122 connected with raw material storage bin 18 and a feed screw 124 rotatably mounted within the barrel. Feed screw 124 may comprise a shaft 126 coupled to motor 22 and include an axis of rotation 128 and a helical blade 130 extending along a length of shaft 126. Accordingly, each raw material delivery device 20 may be referred to as a screw feeder that includes an axis of rotation about which feed screw 124 rotates. For example, referring to FIG. 4, in some embodiments, melting vessel 14 may comprise a first screw feeder 20a configured to deliver raw material 24 to the melting vessel with first feed screw 124a, such as through a first feed port 118a, and a second screw feeder 20b configured to deliver raw material 24 to melting vessel 14 with second feed screw 124b, such as through a second feed port 118b. In some embodiments, first axis of rotation 128a may be substantially parallel with first side wall 104. In some embodiments, second axis of rotation 128b may be substantially parallel with second side wall 106. In some embodiments, second axis of rotation 128b may be substantially parallel with first axis of rotation 128a. In some embodiments, first axis of rotation 128a and second axis of rotation 128b can be equidistant from longitudinal centerline CL.

Figure 4:
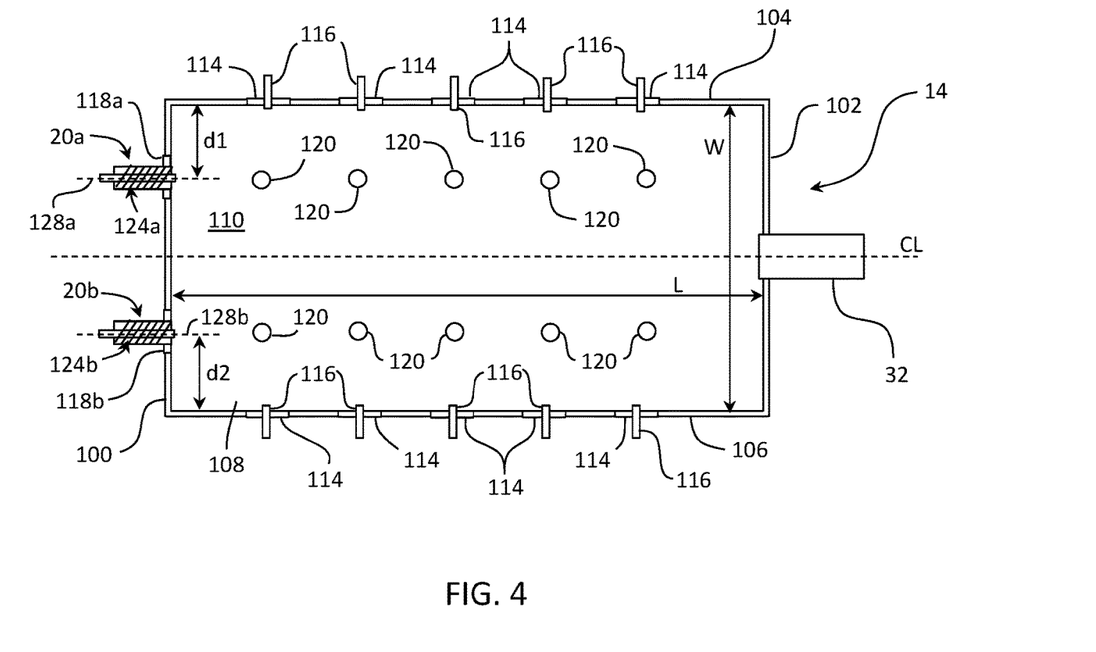
FIG. 4 is a cross sectional top view of the melting vessel of FIG. 3.

In some embodiments, a distance d1 between first axis of rotation 128a along a line perpendicular to the first axis of rotation (e.g., measured proximate back wall 100, for example along the inside surface of back wall 100) is equal to or less than about 15% of the width W of the melting vessel. Additionally, a distance d2 along a line perpendicular to second axis of rotation 128b (e.g., measured proximate back wall 100, for example along the inside surface of back wall 100) is equal to or less than about 15% of the width W of the melting vessel.

In some embodiments, either one or both of first axis of rotation 128a and second axis of rotation 128b can be located equal to or less than about 40 centimeters from the inside surfaces of the first and second side walls, respectively. That is, in some embodiments, either one or both of d1 and d2 can be equal to or less than about 40 centimeters. In some embodiments, first axis of rotation 128a and second axis of rotation 128b can be located equal to or less than about 38 centimeters from the inside surfaces of the first and second side walls, respectively. For example, d1 and/or d2 may be in a range from about 5 centimeters to about 40 centimeters, such as in a range from about 5 centimeters to about 38 centimeters, in a range from about 5 centimeters to about 28 centimeters, in a range from about 5 centimeters to about 20 centimeters or in a range from about 10 centimeters to about 20 centimeters.

In operation, the one or more raw material delivery devices 20 deliver raw material 24 to melting vessel 14 in response to a signal received from one or more level probes 132 positioned downstream of melting vessel 14 that sense a level of molten material within manufacturing apparatus 10 and communicate with motor 22, such as through a programmable logic controller (PLC) 133. For example, a level probe 132 may be positioned within or downstream of fining vessel 34. In some embodiments, level probe 132 may be positioned within conduit 38 as illustrated by FIG. 2. Each raw material delivery device may be electrically coupled with a control device (e.g., PLC 133) configured to control the feeding of raw material into the melting vessel, for example in response to a signal from a level probe. As feed screw 124 rotates, raw material is provided into barrel 122 from raw material storage bin 18 and pushed through barrel 122 by rotating feed screw 124. When the raw material reaches the end of barrel 122, the raw material enters basin 110, the raw material typically accumulating in a pile (batch pile) beneath the screw feeder outlet and joining with a foamy layer of scum 134 (see FIG. 6) that floats on the surface of the molten glass. The scum layer comprises melting byproducts and extends from back wall 100 in a direction toward front wall 102, is generally rich in silica, is combined with gases released during melting, and is difficult to dissolve into the molten glass. Scum layer 134 may approach the front wall, and in some embodiments extends across the entire surface of the melt. As raw material 24 spreads forward from the batch pile, the raw material forms streams that propagate toward the front wall in nonlinear patterns termed "batch snakes" (see FIG. 1). Radiant and convective heat transfer from burners 116 help heat and melt the raw material. Similarly, an electric voltage may be applied to electrodes 120, establishing an electric current between groups of electrodes, for example pairs of electrodes, the electric current heating the molten glass from within. Accordingly, conductive heat from the melt itself further dissolves the raw material.

It should be noted that not all the raw material introduced by raw material delivery device 20 may completely dissolve within melting vessel 14. For example, the weight of the batch pile directly below the feed port(s) 118 may drive a portion of raw material 24 through scum layer 134 and into the melt early. Heavier individual raw material constituents may also descend through scum layer 134 early and circulate through the molten material. However, as the batch snakes 8 reach forward from the batch pile and eventually descend through scum layer 134 and dissolve into the melt, grains of raw material may be retained within the scum layer sufficiently long for the grains to reach front wall 102. If these grains eventually join the molten material below the scum layer near the front wall 102, there may be insufficient time for the grains of raw material to fully dissolve within the melt, whereupon the incompletely-dissolved grains may become entrained into the flow of molten material exiting melting vessel 14 and enter downstream glass making apparatus 30. Thus, scum layer 134 can be a source of contaminants for the finished glass article, e.g., glass sheet 62, by providing an avenue by which grains of raw material effectively bypass the melting process.

Figure 5:
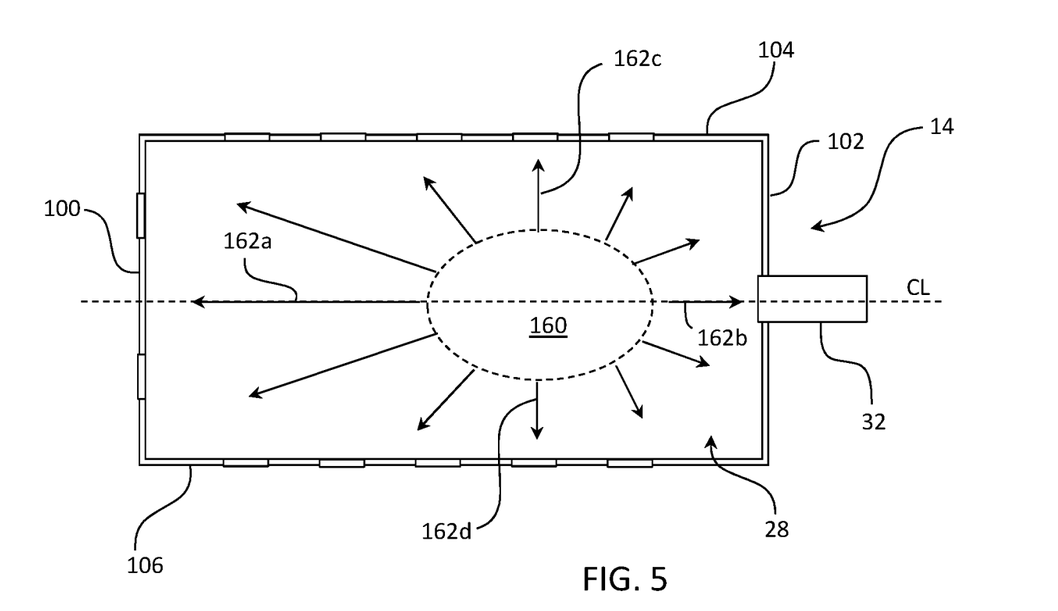
FIG. 5 is a cross sectional top view of the melting vessel of FIG. 3, illustrating surface convection flows emanating from a hot spot.
Figure 6:
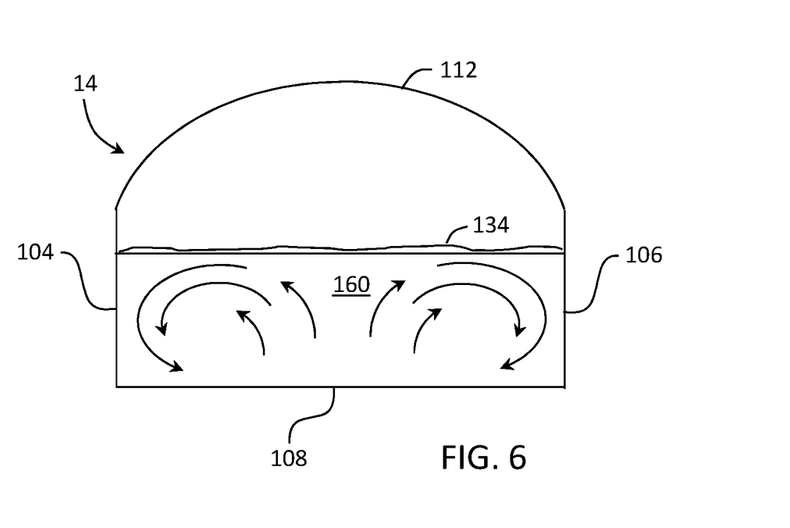
FIG. 6 is a longitudinal cross sectional view of the melting vessel of FIG. 3 illustrating laterally circulating convection currents in the molten material.

Referring now to FIGS. 5 and 6, heat energy applied to molten material 28 through combustion burners 116 and/or voltages applied to the various electrodes 120 can be controlled to produce a hot spot 160 (which is a region of maximum temperature in the melt within basin 110) in the body of molten material 28 such that the temperature differential between the hot spot and the cooler back, front and side walls of the melting vessel establishes a convective flow within the melt. For example, FIG. 5, which is a top view of melting vessel 14 shown without top wall 112, illustrates a pattern of flow vectors, including flow vectors 162a and 162b, radiating outward from hot spot 160. It should be noted that while flow vectors 162a and 162b indicate molten glass flow from hot spot 160 in a longitudinal direction toward back wall 100 and molten glass flow in a direction from hotspot 160 in an opposite longitudinal direction toward front wall 102, respectively, each intermediate, generally rearward, flow vector comprises a rearward (longitudinal) flow component and each generally forward flow vector comprises an opposite forward (longitudinal) flow component. Similarly, two opposite flows occur laterally, each lateral flow extending from hot spot 160 toward an adjacent side wall: lateral flow vector 162c moving in a direction from centerline CL toward first side wall 104 and lateral flow vector 162d moving in a direction from centerline CL toward second side wall 106. Each intermediate flow vector, generally in a width direction, comprises a lateral flow component. While only four flow vectors are shown, it should be recognized that flow vectors emanate outward from hot spot 160 at a large plurality of directions, and only four flow vectors (two longitudinal flow vectors and two lateral flow vectors) are shown. Each flow vector that is not a longitudinal flow vector nor a lateral flow vector nevertheless comprises a longitudinal flow component and a lateral flow component. As used herein, unless otherwise stated, a lateral direction refers to a direction orthogonal to longitudinal axis (centerline) CL while a longitudinal flow refers to a direction parallel with centerline CL. Molten glass within hot spot 160 wells up from the bottom of basin 110 and spreads outward near the surface of the melt toward the side, back and front walls of the melting vessel. For example, FIG. 6 is a lateral cross sectional view of melting vessel 14 illustrating lateral convective flow of molten material that rises within the hot spot, crosses respective portions of the melt near the surface of the melt, then descends toward the bottom of basin 110 at the side walls and flows across the bottom of the melting vessel toward the hot spot. Thus, as illustrated, two counter-rotating convective currents (e.g., "cells") are established. Similar flow is established in longitudinal directions.

It was discovered during melting vessel design modifications that cord concentration in finished glass articles correlated strongly to batch flow patterns on the surface of the melt. That is, it was found that reduced cord was most favored when batch snakes 8 traverse the surface of the melt in close proximity to the side walls 104, 106. Without wishing to be held to theory, it is believed batch snakes 8 that traverse the surface of the melt near the side walls experience greater residence time in the melt, and therefore are subject to more complete melting and dispersal within the melt than batch snakes that traverse near the centerline of the melting vessel and therefore reach hot spot 160 more directly. Additionally, it was further discovered that a correlation existed between convective flow velocity, in particular lateral flow velocity (in a direction extending laterally outward from the centerline of the melting vessel, and in particular from the hot spot) and screw feeder position. That is, screw feeders positioned to deliver raw material into the melting vessel closer to the side walls resulted in more stable batch snakes. By stable batch snakes what is meant is batch snakes that tend to flow along and proximate the side walls in a direction toward the front wall. In contrast, it was found that batch snakes that originate nearer the centerline of the melting vessel tend to meander randomly within the melting vessel and are therefore more likely to result in cord.

The convective flows are determined and evaluated by the Rayleigh number Ra, a dimensionless scaling factor for convection, in the form of $Ra=(g\beta\Delta Tx^3)/(v_1\alpha_1)$ were g represents acceleration due to gravity, $\beta$ represents the nominal coefficient of thermal expansion of the melt, $\Delta T$ is the thermal difference driving convection, x is the characteristic length, $v_1$ is the kinematic viscosity and $\alpha_1$ is the thermal diffusivity of the melt. The strength of the convective force is determined by the glass coefficient of thermal expansion $\beta$ which drives the magnitude of density difference between the hot and cold zones of the melting vessel and the molten material therein, the viscosity of the molten material in the melting vessel over the hot-cold temperature range, the difference in temperature ($\Delta T$) between the hot and cold zones, and the distance between the hot and cold zones. Flow within the melting vessel can be modeled using the Rayleigh number, for example by employing commercially available software packages, such as Fluent®, available from ANSYS®, Inc.

Figure 7:
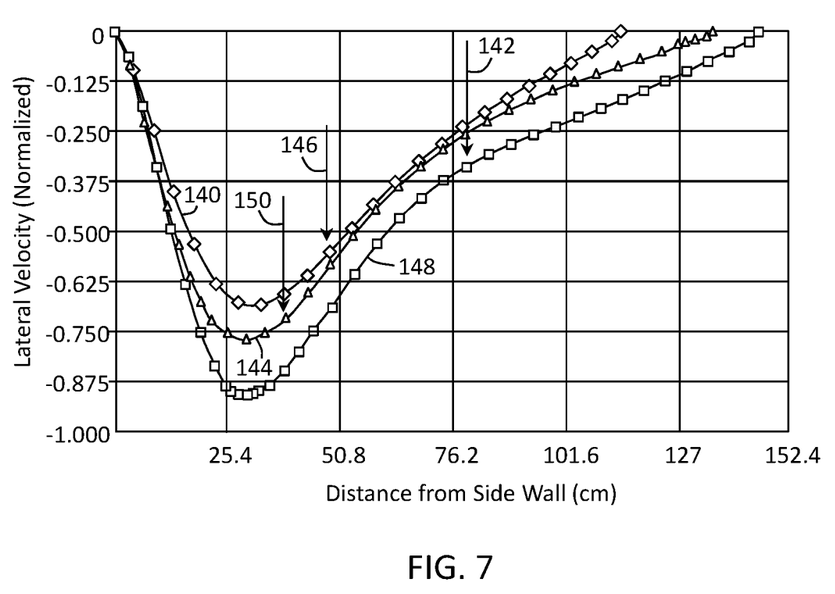
FIG. 7 is a graph showing modeled lateral velocity of convection currents at a depth of 7.62 cm below the surface of the molten material in three different melting vessels with differing raw material feeding positions relative to the inside surfaces of the side walls of the melting vessels, and further relative to the maximum velocity of the lateral subsurface flow.
Figure 8:
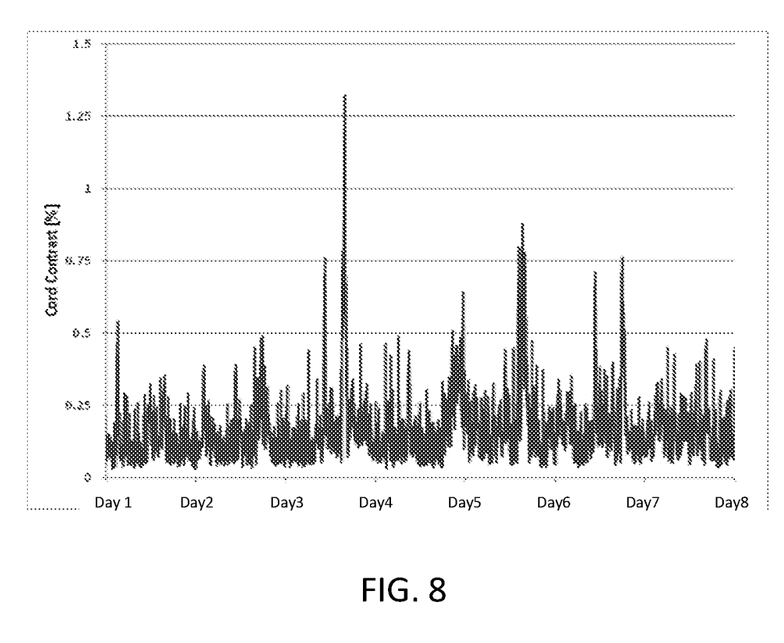
FIG. 8 is a chart showing the magnitude of cord detected within glass sheets formed using a first melting vessel with a first feed position relative to the side walls of the melting vessel as a function of time.
Figure 9:
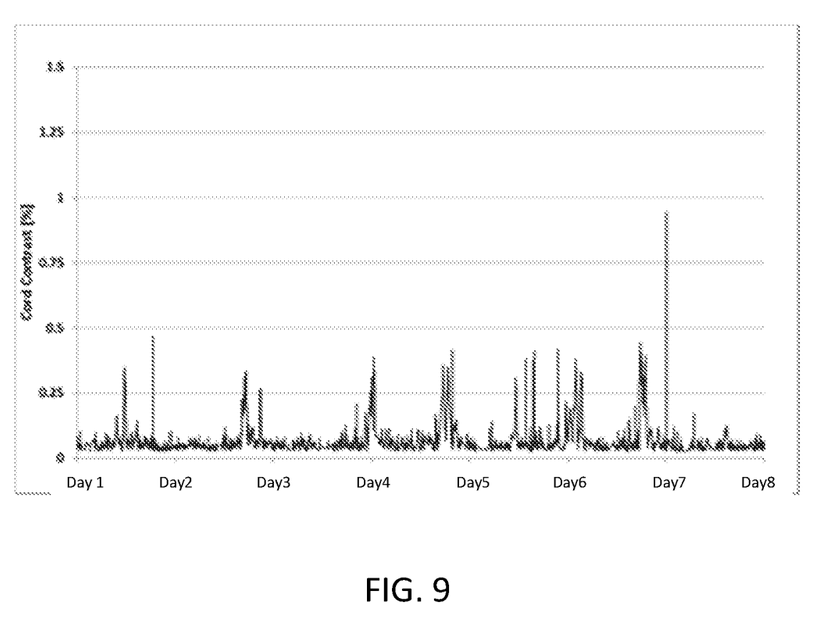
FIG. 9 is another chart showing the magnitude of cord detected within glass sheets formed using a second melting vessel with a second feed position relative to the side walls of the melting vessel less than the feed position of the first melting vessel of FIG. 8 as a function of time.

FIG. 7 is a graph showing modeled and normalized lateral flow velocity (flow of the molten material in a direction orthogonal from centerline CL of the melting vessel to and toward a side wall, for example first side wall 104 and/or 106) at a depth of 3 inches (7.62 centimeters) below the surface of the molten material as a function of distance from the side wall. The data illustrate flow velocity for three different melting vessels: a first vessel that exhibited less-than-desirable cord performance represented by curve 140 (diamond data points), a second vessel that exhibited even worse cord performance than the first melting vessel represented by curve 142 (square data points), and a third melting vessel that exhibited much-improved cord performance that out-performed both of the first and second melting vessels, represented by curve 144 (triangle data points). Arrow 146 is directed to the side-wall-to-feed-screw-axis distance (about 79 cm, or within about 16% of the total width W of the melting vessel basin) for the first melting vessel, arrow 148 is directed to the side-wall-to-feed-screw-axis distance (about 48 cm, or within about 27% of the total width W of the melting vessel basin) for the second melting vessel, and arrow 150 is directed to the side-wall-to-feed-screw-axis distance (about 38 cm, or within about 14% of the total width W of the melting vessel basin) for the third melting vessel. As indicated, the best performance for cord was obtained from the third melting vessel having a reduced side-wall-to-feed-screw-axis distance when compared with the first and second melting vessels. Additionally, FIG. 8 depicts cord performance as a percent contrast for the first melting vessel as a function of time, while FIG. 9 depicts cord performance as a percent contrast as a function of time for the third melting vessel. A significant decrease in cord for the third melting vessel, wherein raw material 24 is fed to the melting vessel within about 38 cm of a side wall, is clearly evident. Cord measurement is performed using a near-infrared light source, optical fiber and discrete free-space optics to launch a free-space collimated beam. The collimated beam is transmitted through the finished product, e.g., flat glass sheet, and into a detector assembly on the opposite side, where the transmitted light is focused by a lens and captured by a sensing element with an oriented slit aperture. A coherence length of the collimated beam is less than the glass sheet thickness, with a uniform phase front across the beam width. As the beam passes through a glass sheet with cord, the beam phase is weakly modulated by the thickness variations. The optical effect is similar to that of a diffraction grating, and to the production of the zero-order and the two first-order diffracted fields. These diffracted fields interfere as they continue to propagate to give intensity maxima and minima as a function of distance from the substrate. A focusing lens is used to enhance the contrast and to shorten the optical path length to the sensing element, and the slit aperture is used to achieve an appropriate amount of spatial resolution and insensitivity to vibration. The cord measurement is made by moving the sensor element in an across-the-substrate direction, all while recording the amount of power received by the detector. Digital filtering of the detector signal profiles may be performed to extract out cord contrast.

The measurement results for the third melting vessel depicted in FIG. 9 indicate an average cord performance over an 8 day period well below about 0.25% contrast, with only a single occurrence of contrast above 0.5% contrast, but less than 1% contrast. By way of comparison, cord measurements for the first melting vessel depicted in FIG. 8 depict an average cord performance over a similar period of time well above 0.25% contrast.

Accordingly, a method is disclosed comprising a first step of forming a molten material in a melting vessel basin, the melting vessel comprising a back wall, a front wall, a first side wall, and a second side wall, the melting vessel further including a longitudinal centerline extending from the back wall to the front wall inside surfaces and a width orthogonal to the longitudinal centerline extending between an inside surface of the first side wall and an inside surface of the second side wall. The molten material may be formed by heating raw material, and/or cullet, using a suitable source of heat, for example combustion burners positioned to produce a flame overtop the raw material. The source of heat melts the raw material to form a molten material 28 (e.g., molten glass). The melting vessel may be, for example, a refractory melting vessel.

In another step, the molten material may be further heated, thereby forming a convection cell within molten material 28 comprising a first flow of molten material flowing in a first direction toward the first side wall relative to the longitudinal centerline at a first flow velocity (e.g., flow vector 162c) the first flow velocity varying as a function of distance from longitudinal centerline CL. The convection cell within molten material 28 may further comprising a second flow of molten material flowing in a second direction toward the second side wall relative to the longitudinal centerline at a second flow velocity (e.g., flow vector 162d) the second flow velocity varying as a function of distance from longitudinal centerline CL. The further heating may be performed via combustion burners positioned so as to produce flames extending over a surface of the molten glass, or by an electric current established through the molten glass by electrodes extending into the molten glass, or both combustion and electric current. The melting vessel may be, for example, an electrically boosted melting vessel.

In another step, a first distance from an inside surface of the first side wall, e.g., side wall 104, along the first direction where the first flow velocity is at a maximum is calculated. The maximum flow velocity may be calculated below a surface of the molten material, for example at a distance from the surface of the molten material in a range from about 3 centimeters beneath the surface of the molten material to a distance about 13 centimeters beneath the surface of the molten material, for example in a range from about 4 centimeters to about 12 centimeters, for example in a range from about 4 centimeters to about 8 centimeters, including all ranges and subranges therebetween.

In an optional step, a second distance from an inside surface of the second side wall, e.g., side wall 106, along the first direction where the first flow velocity is at a maximum may be calculated. The maximum flow velocity may be calculated below a surface of the molten material, for example at a distance from the surface of the molten material in a range from about 3 centimeters beneath the surface of the molten material to a distance about 13 centimeters beneath the surface of the molten material, for example in a range from about 4 centimeters to about 12 centimeters, for example in a range from about 4 centimeters to about 8 centimeters, including all ranges and subranges therebetween.

In still another step, raw material may be fed into an interior of the melting vessel using a first screw feeder, e.g., screw feeder 20a including a first feed screw 124a comprising a first axis of rotation 128a, the first screw feeder positioned such that distance d1 between the first axis of rotation and the inside surface of the first side wall 104 is substantially equal to the calculated first distance, for example within about 10% of the calculated first distance.

In some embodiments, a second distance from an inside surface of the second side wall along the second direction where the second flow velocity is at a maximum is calculated. Raw material may be fed into an interior of the melting vessel using a second screw feeder, e.g., screw feeder 20b comprising a second feed screw 124b and a second axis of rotation 128b, the second screw feeder positioned such that distance d2 between the second axis of rotation and the inside surface of the second side wall is substantially equal to the calculated distance for the second flow vector 162d, for example within about 10% of the calculated distance. However, in some embodiments it may be satisfactory to assume a certain symmetry in the melt and calculate only one distance, for example the first distance from an inside surface of the first side wall along the first direction where the first flow velocity is at a maximum, and assume the second distance is approximately equal to the first distance. Accordingly, d2 may be equal to d1.

It will be apparent to those skilled in the art that various modifications and variations can be made to embodiments of the present disclosure without departing from the spirit and scope of the disclosure. Thus it is intended that the present disclosure cover such modifications and variations provided they come within the scope of the appended claims and their equivalents.

What is claimed is:

1. A melting apparatus, comprising:
a melting vessel comprising a back wall, a front wall, a first side wall and a second side wall, the melting vessel further comprising a longitudinal centerline extending from the back wall to the front wall and a width extending between an inside surface of the first side wall and an inside surface of the second side wall, the width orthogonal to the longitudinal centerline; and
a first feed screw comprising a first axis of rotation disposed on a first side of the longitudinal centerline, the first feed screw configured to feed a first raw material into the melting vessel through a first feed port disposed on the back wall, wherein a distance between the first axis of rotation and the inside surface of the first side wall on a line perpendicular to the first axis of rotation is equal to or less than about 15% of the width of the melting vessel, and wherein there are no feed screws on the first side of the longitudinal centerline having an axis of rotation disposed farther than 15% of the width of the melting vessel from the inside surface of the first side wall.

2. The apparatus according to claim 1, further comprising a second feed screw comprising a second axis of rotation disposed on a second side of the longitudinal centerline, the second feed screw configured to feed a second raw material into the melting vessel, wherein a distance between the second axis of rotation and the inside surface of the second side wall on a line perpendicular to the second axis of rotation is equal to or less than about 15% of the width of the melting vessel.

3. The apparatus according to claim 2, wherein each of the first axis of rotation and the second axis of rotation are located equal to or less than about 38 centimeters from the inside surfaces of the first and second side walls, respectively.

4. The apparatus according to claim 2, wherein the second feed material is the same as the first feed material.

5. The apparatus according to claim 2, wherein each of the first axis of rotation and the second axis of rotation are located equal to or less than about 28 centimeters from the inside surfaces of the first and second side walls, respectively.

6. The apparatus according to claim 1, wherein the first axis of rotation is substantially parallel with the first side wall.

7. The apparatus according to claim 2, wherein the second axis of rotation is substantially parallel with the second side wall.

8. The apparatus according claim 2, wherein the second axis of rotation is substantially parallel to the first axis of rotation.

9. The apparatus according to claim 2, wherein the melting vessel comprises a plurality of electrodes exposed to an interior of the melting vessel.

10. The apparatus according to claim 9, wherein the melting vessel further comprises a bottom wall, and the plurality of electrodes extend into the interior of the melting vessel through the bottom wall.

11. The apparatus according to claim 9, wherein the plurality of electrodes comprise molybdenum.

12. The apparatus according to claim 1, wherein the melting vessel comprises a plurality of combustion burners exposed to an interior of the melting vessel through the first and second side walls.

13. The apparatus according to claim 1, wherein the line perpendicular to the first axis of rotation is located at an inside surface of the back wall.

14. The apparatus according to claim 2, wherein the line perpendicular to the second axis of rotation is located at an inside surface of the back wall.

15. The apparatus according to claim 2, wherein the first axis of rotation and the second axis of rotation are equidistant from the longitudinal centerline.

16. A method for charging a melting vessel, comprising:
feeding a first raw material into an interior of the melting vessel with a first feed screw comprising a first axis of rotation, the melting vessel comprising a back wall, a front wall, a first side wall and a second side wall, the melting vessel further including a longitudinal centerline extending from the back wall to the front wall and a width extending between an inside surface of the first side wall and an inside surface of the second side wall, the width orthogonal to the longitudinal centerline, wherein:
the first feed screw is disposed on a first side of the longitudinal centerline and is configured to feed the first raw material into the melting vessel through a first feed port disposed on the back wall,
a distance between the first axis of rotation and the inside surface of the first side wall on a line perpendicular to the first axis of rotation is equal to or less than about 15% of the width of the melting vessel, and
there are no feed screws on the first side of the longitudinal centerline having an axis of rotation disposed farther than 15% of the width of the melting vessel from the inside surface of the first side wall.

17. The method according to claim 16, further comprising feeding a second raw material into the interior of the melting vessel with a second feed screw comprising a second axis of rotation, wherein:
the second feed screw is disposed on a second side of the longitudinal centerline, and
a distance between the second axis of rotation and an inside surface of the second side wall on a line perpendicular to the second axis of rotation is equal to or less than about 15% of the width of the melting vessel.

18. The method according to claim 17, wherein the first axis of rotation and the second axis of rotation are located equal to or less than about 40 centimeters from the inside surfaces of the first and second side walls, respectively.

19. The method according to claim 16, wherein the melting vessel contains a molten material during the feeding, the method further comprising heating the molten material by establishing an electric current between a plurality of electrodes in contact with the molten material.

20. The method according to claim 19, wherein the plurality of electrodes extend into the molten material through a bottom wall of the melting vessel.

21. The method according to claim 19, wherein each electrode of the plurality of electrodes extends into the molten material a distance of at least 15 centimeters.

22. The method according to claim 19, wherein the plurality of electrodes comprise molybdenum.

23. The method according to claim 19, wherein the heating further comprises heating the molten material using a plurality of combustion burners exposed to an interior of the melting vessel through the first and second side walls.

24. The method according to claim 23, wherein a total energy introduced into the molten material by the electric current and the combustion burners is equal to or greater than about 20% by the electric current and equal to or less than about 80% by the combustion burners.

25. The method according to claim 19, wherein the molten material is molten glass, the method further comprising drawing the molten glass into a glass sheet, the glass sheet comprising an average cord contrast less than about 0.25%.

* * * * *

UNITED STATES PATENT AND TRADEMARK OFFICE
CERTIFICATE OF CORRECTION

| | | |
|---|---|---|
| PATENT NO. | : 11,319,234 B2 | |
| APPLICATION NO. | : 16/328068 | |
| DATED | : May 3, 2022 | |
| INVENTOR(S) | : Mark Alan Cook et al. | |

It is certified that error appears in the above-identified patent and that said Letters Patent is hereby corrected as shown below:

In the Claims

Column 19, Line 65, Claim 8, delete "according" and insert -- according to --.

Signed and Sealed this
Nineteenth Day of July, 2022

Katherine Kelly Vidal
*Director of the United States Patent and Trademark Office*